United States Patent
Hasegawa

(10) Patent No.: US 9,346,369 B2
(45) Date of Patent: May 24, 2016

(54) CHARGING DEVICE

(71) Applicant: Nissan Motor Co., Ltd., Yokohama, Kanagawa (JP)

(72) Inventor: Noriaki Hasegawa, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 236 days.

(21) Appl. No.: 14/346,449

(22) PCT Filed: Sep. 21, 2012

(86) PCT No.: PCT/JP2012/074257
§ 371 (c)(1),
(2) Date: Mar. 21, 2014

(87) PCT Pub. No.: WO2013/051406
PCT Pub. Date: Apr. 11, 2013

(65) Prior Publication Data
US 2014/0225561 A1  Aug. 14, 2014

(30) Foreign Application Priority Data

Oct. 7, 2011  (JP) .................................. 2011-222530

(51) Int. Cl.
*B60L 11/18* (2006.01)
*H02J 7/04* (2006.01)
(Continued)

(52) U.S. Cl.
CPC ........... *B60L 11/1824* (2013.01); *B60L 11/185* (2013.01); *B60L 11/1816* (2013.01); *B60L 11/1825* (2013.01); *H02J 7/0027* (2013.01); *H02J 7/041* (2013.01); *B60L 2200/26* (2013.01); *B60L 2210/30* (2013.01); *B60L 2210/40* (2013.01); *B60L 2230/12* (2013.01); *B60L 2230/16* (2013.01); *B60L 2240/36* (2013.01); *B60L 2240/662* (2013.01); *B60L 2240/80* (2013.01); *B60L 2260/58* (2013.01); *H01M 10/44* (2013.01); *H01M 2200/20* (2013.01); *H02J 7/0014* (2013.01); *H02J 7/02* (2013.01);
(Continued)

(58) Field of Classification Search
CPC .......................... B60L 11/1824; H02J 7/0027
USPC ........................................................ 320/108
See application file for complete search history.

(56) References Cited

U.S. PATENT DOCUMENTS 5,594,318 A * 1/1997 Nor ..................... B60L 11/1816
 320/108
8,378,627 B2  2/2013 Asada et al.

FOREIGN PATENT DOCUMENTS

CN  101997321 A  3/2011
EP  1953031 A1  8/2008
(Continued)

*Primary Examiner* — Sun Lin
(74) *Attorney, Agent, or Firm* — Global IP Counselors, LLP

(57) ABSTRACT

A charging device is provided with a charger, a charging time setting unit and a usage latency calculation unit. The charger is configured to charge a vehicle battery. The charging time setting unit sets a charging time for charging the vehicle battery. The usage latency calculation unit calculates a latency of usage of the charger. The usage latency is a time between an end time of charging of a first vehicle connected to the charger and a start time of charging of a second vehicle connected to the charger and charged after the first vehicle. The charging time setting unit compares the usage latency with a first threshold time and a second threshold time shorter than the first threshold time. The charging time setting unit sets the charging time in accordance with whether or not the usage latency is between the first and second threshold times.

14 Claims, 4 Drawing Sheets

(51) Int. Cl.
*H01M 10/44* (2006.01)
*H02J 7/02* (2016.01)
*H02J 7/00* (2006.01)

(52) U.S. Cl.
CPC .............. *H02J 7/042* (2013.01); *Y02T 10/7005* (2013.01); *Y02T 10/7055* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01)

(56) References Cited

FOREIGN PATENT DOCUMENTS

| JP | 2001-16797 A | 1/2001 |
| JP | 2010-61161 A | 3/2010 |
| JP | 2010-114988 A | 5/2010 |
| JP | 2010-230499 A | 10/2010 |
| JP | 2010-286943 A | 12/2010 |

\* cited by examiner

US 9,346,369 B2

CHARGING DEVICE

CROSS-REFERENCE TO RELATED APPLICATIONS

This application is a U.S. National stage application of International Application No. PCT/JP2012/074257, filed Sep. 21, 2012, which claims priority to Japanese Patent Application No. 2011-222530 filed in Japan on Oct. 7, 2011, the contents of which are hereby incorporated herein by reference.

BACKGROUND

1. Field of the Invention

The present invention relates to a charging device.

2. Background Information

There is known a vehicle charging device that is set up in a parking lot and is used for supplying power to charge a running battery of a vehicle that uses an electric motor as a drive power supply (Japanese Laid-Open Patent Application No. 2010-114988). The vehicle charging device comprises: an advertisement data storage unit for storing advertisement data, being data for presenting an advertisement; and an advertisement data transmission unit for transmitting advertisement data stored in the advertisement data storage unit to the vehicle. Charging to the running battery is performed after transmission of the advertisement data to the vehicle from the advertisement data transmission unit is completed, and charging is performed until the running battery is fully charged.

SUMMARY

In the abovementioned conventional art, there is a problem that the charging time is determined in accordance with the available capacity of the running battery, in a state in which there is a vehicle already charged by the vehicle charging device and there is a plurality of vehicles waiting to be charged, charging cannot be started for the plurality of vehicles until the battery of the vehicle first being charged is completely charged, and therefore the waiting time for charging becomes longer.

A problem to be solved by the present invention is to provide a charging device in which the waiting time for charging can be shortened.

The present invention solves the abovementioned problem by providing charging time setting means for setting a charging time for charging a battery, and usage latency calculating means for calculating the latency of usage of a charger, the usage latency being the time between the end of charging of a first vehicle connected to the charger and the start of charging of a second vehicle charged after the first vehicle; the charging time setting means setting the charging time in accordance with the usage latency.

In the present invention, the waiting time for charging can be shortened because the charging time is adjusted after having discriminated whether a vehicle waiting to be charged is present or absent in accordance with the length of the usage latency.

BRIEF DESCRIPTION OF THE DRAWINGS

Referring now to the attached drawings which form a part of this original disclosure.

DETAILED DESCRIPTION OF THE EMBODIMENTS

Embodiments of the present invention are described below based on the drawings.

First Embodiment

Figure 1:
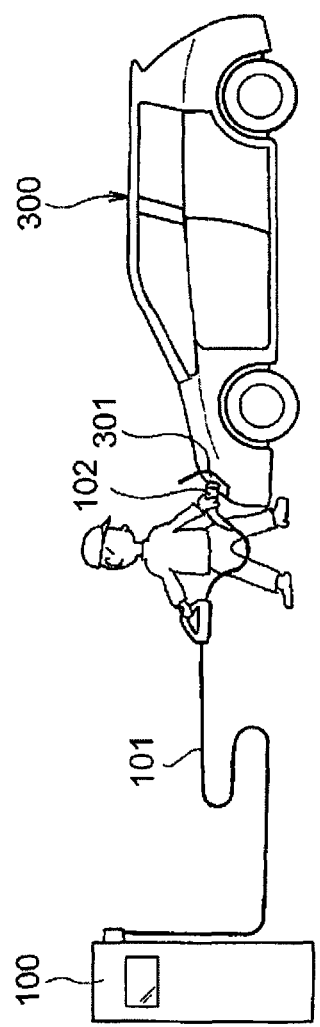
FIG. 1 is a schematic diagram of a charging system including the charging device according to an embodiment of the present invention.
Figure 2:
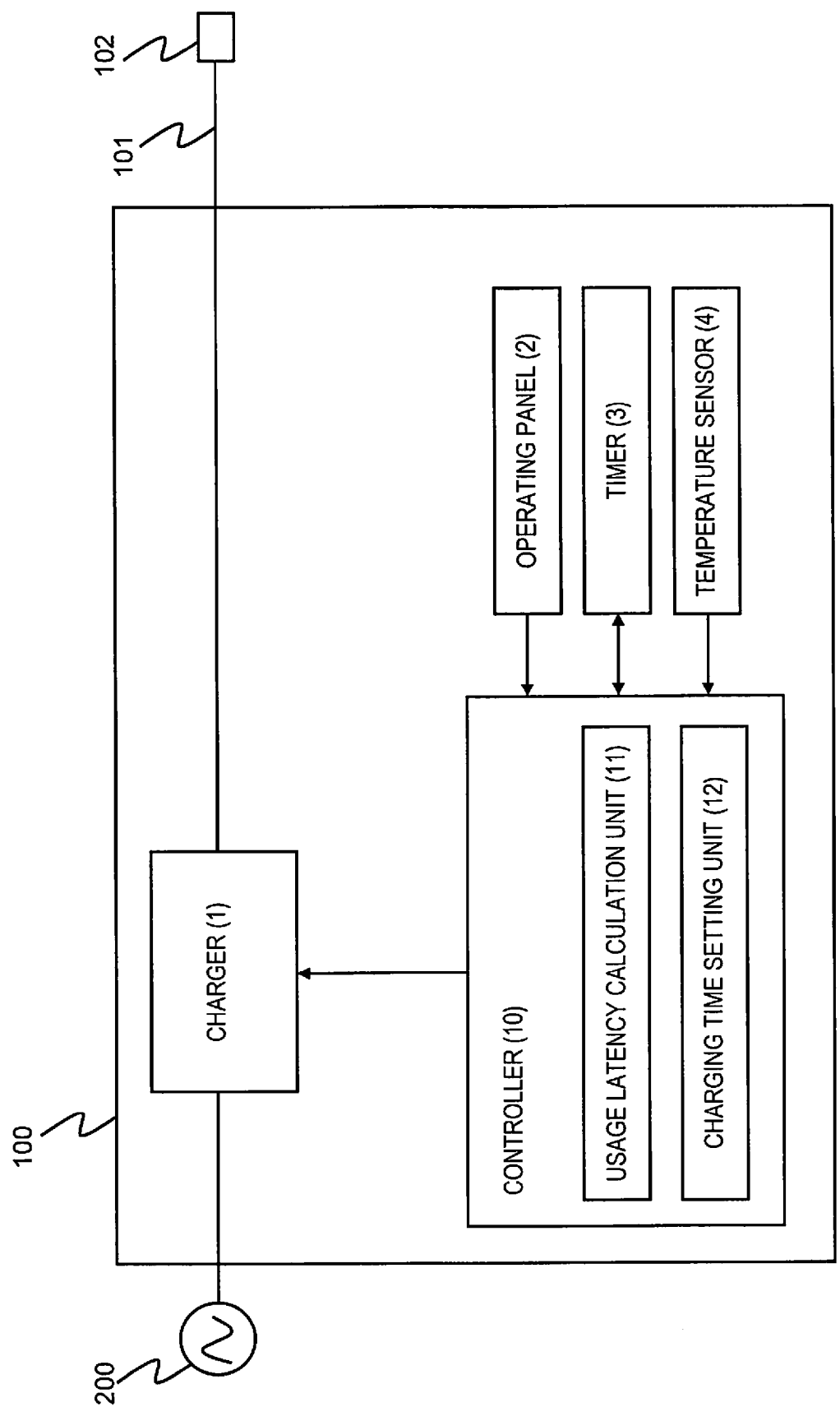
FIG. 2 is a block diagram of the charging device illustrated in FIG. 1.

FIG. 1 is a schematic diagram of a charging system including the charging device according to an embodiment of the present invention. FIG. 2 is a block diagram of the charging device of the present example. The charging system of the present example is provided, for example, in a parking lot of a shopping mall, a parking lot of a facility providing a car sharing service of electric automobiles, a parking lot of a company using electric automobiles as company cars, and the like.

The charging system in the present example is provided with a charging device 100 for charging a running battery (not illustrated) of a vehicle 300 as illustrated in FIG. 1.

The vehicle 300 in the present embodiment is, for example, an electric automobile or a plug-in type hybrid car, being a vehicle having a motor generator as a power supply and a running or other battery for charging and discharging with the motor generator.

An operating panel 2, being a touch panel, is provided on the front face of the charging device 100. For example, a charging operator (for example, a driver) performing a charging operation can perform an operation for starting, stopping, or otherwise controlling charging by touching a button on the operating panel 2 in accordance with instructions displayed on the operating panel 2 when charging the battery of the vehicle 300.

The charging device 100 is a charging stand for supplying power to the vehicle 300 to charge the running battery of the vehicle 300. The charging device has internally installed a charger 1 provided with a power converter for converting AC power of a commercial AC power supply 200 to DC power and boosting the DC power to a prescribed voltage, and DC current converted by the charger 1 is supplied to the battery of the vehicle 300 by way of a charging cable 101.

As illustrated in FIG. 1, a charging connector 102 is attached to the leading end of the charging cable 101, and the charging operator installs the charging connector 102 in a power supply inlet 301 on the vehicle 300, whereby the charging device 100 and the battery of the vehicle 300 are electrically connected by way of the charging cable 101.

As illustrated in FIG. 2, the charging device 100 is provided with a charger 1, an operating panel 2, a timer 3, a temperature sensor 4 and a controller 10. The charging device 100 is connected to the AC power supply 200. The charging connector 102 is also connected by way of the charging cable 101 to the power output side of the charging device 100.

The charger 1 has an inverter, or the like, and is a charging circuit for charging the battery of the vehicle 300. The charger 1 is controlled based on control signals from the controller 10, AC power supplied from the AC power supply 200 is converted to power suitable for charging the running battery, and the power is supplied to the battery of the vehicle 300, whereby the battery is charged. The operating panel 2 is a touch panel provided on the front face of the charging device 100, and a button indicating to start charging and a button indicating to end charging are displayed. When the charging operator touches the button, the operating panel 2 transmits to the controller 10 a signal corresponding to the button, for example, an operating signal for starting charging or an operating signal for ending charging.

The timer 3 is a clock for counting a usage latency of the charging device 100, and is started and stopped in response to control signals from the controller 10. The temperature sensor 4 is a sensor for detecting an ambient temperature (peripheral temperature) of the environment in which the charging device 100 is placed.

The controller 10 has a usage latency calculation unit 11 and a charging time setting unit 12. The controller 10 is a controller for controlling the charger 1, the operating panel 2, the timer 3, and the temperature 4, and controls the entire charging device 100. The usage latency calculation unit 11 calculates a usage latency of the charger 1 by counting a time between a charging end time of a vehicle charged first and a charging start time of a vehicle charged immediately following the vehicle charged first from time information from the timer 3. The charging time setting unit 12 sets a time for charging the battery of the vehicle, in other words, a time in which power is supplied from the charger 1 to the battery. The charging time setting unit 12 sets the charging time in accordance with the usage latency calculated by the usage latency calculation unit 11.

The control of the charging device 100 of the present example is next described using FIGS. 1 and 2. The charging control of the charger 1 is first described.

A maximum time ($T_{max}$) of charging time is predetermined in the charging device 100 of the present example, and the power supply time per cycle of charging in principle does not exceed the maximum charging time ($T_{max}$). The charging device 100 also charges the battery in a charging time set by the charging time setting unit 12 as described later, and ends charging at a time when the charging time is reached from the time when charging of the battery was started, or at a time when the charging capacity of the battery reaches full charge.

When the vehicle 300 is connected to the charging connector 102 and the charging start button displayed on the operating panel 2 is pressed by the charging operator, the controller 10 controls the charger 1 and starts charging in the charging time set by the charging time setting unit 12. The controller 10 monitors the battery capacity during charging of the battery. The controller 10 also ends charging when the battery capacity reaches full charge before the set charging time is reached. The controller 10 also ends charging, for example, when an operation to compulsorily end charging is made by the charging operator, even when the battery capacity has not yet reached full charge.

Meanwhile, the controller 10 ends charging when an elapsed time from the charging start time is reached before the battery capacity reaches full charge. The controller 10 displays that charging is ended on the display of the charging device 100 when charging is ended.

The control for setting the charging time is next described. The controller 10 calculates a usage latency using the usage latency calculation unit 11 in order to set the charging time using the charging time setting unit 12.

The usage latency is described here. In the charging system of the present example, when a vehicle 300 is connected to the charging cable 101 and charging is in progress, another vehicle 300 to be charged using the same charging device 100 must wait until the end of charging of the vehicle 300 being charged. When another vehicle 300 other than the above other vehicle 300 also is to be charged using the same charging device, this vehicle must wait until the end of charging of the vehicle being charged first, as well as the end of charging of the vehicle waiting to be charged ahead of this vehicle.

For example, assume that a first vehicle is being charged, a second vehicle is waiting to be charged, and a third vehicle is waiting to be charged following the second. When charging is performed using the charging device 100 of the present example, charging must be performed in a state in which a vehicle is parked in a parking space where the charging device 100 is provided. When the first vehicle parks in the prescribed parking space to be charged and charging ends, the first vehicle is moved from the prescribed parking space and the second vehicle waiting to be charged next parks in the prescribed parking space and starts charging. When charging of the second vehicle ends, the second vehicle is moved from the prescribed parking space and the third vehicle waiting to be charged next parks in the prescribed parking space and starts charging.

The usage latency of the charger 1 in such case is a time from the charging end time of the first vehicle to the charging start time of the second vehicle, and a time from the charging end time of the second vehicle to the charging start time of the third vehicle. That is, the usage latency is the time when the charging device 100 is not being used, and is equivalent to the time when power is not being output from the charger 1.

The usage latency calculation unit 12 uses a timer 3 in order to calculate the usage latency. When the supply of power from the charger 1 to the battery is ended by the controller 10 and charging of the battery ends, the controller 10 transmits to the timer 3 a start signal for starting the timer 3 in the same timing as the end of charging. The timer 3 is started in response to the start signal, and starts to count an elapsed time (Tn) from the charging end time.

While the time is counted by the timer 3, the first vehicle having ended charging is moved, the second vehicle is parked in the prescribed parking space, and the charging connector 102 is connected to the second vehicle. When the charging operator of the second vehicle touches the button indicating to start charging on the display screen of the operating panel 2, a signal indicating to start charging is transmitted from the operating panel 2 to the controller 10. When controller 10 receives the charging start signal, a stop signal to stop the timer 3 is transmitted to the timer 3. The timer 3 is stopped in response to the stop signal.

The usage latency calculation unit 11 also calculates the counted time from start to end of the timer as the usage latency. The usage latency calculation unit 11 thereby calculates the usage latency, being the time from the end of charging to the next start of charging.

A recharging threshold time (Ta) and a vehicle backlog threshold time (Tb) are set in the controller 10 in order to determine whether recharging of the same vehicle was performed or whether a backlog of vehicles to be charged has arisen in the charging device 100 in accordance with the usage latency calculated by the usage latency calculation unit 11. The recharging threshold time (Ta) is set to a time shorter than the vehicle backlog threshold time (Tb).

The recharging threshold time (Ta) is described. Assume that a vehicle 300 was being charged by the charging device 100 and charging ended because the elapsed time from the start of charging reached the maximum charging time ($T_{max}$) before the battery of the vehicle 300 reached full charge. Also assume that there were no vehicles waiting to be charged by the charging device 100 other than that vehicle 300 at the end of charging. In order to bring the battery to full charge, the charging operator of the vehicle 300 confirms that there is no vehicle waiting to be charged, again operates the operating panel 2, presses the charging start button, and restarts charging.

When the battery of the same vehicle is recharged as above, the usage latency from the first charging end time to the second charging start time is short because there is no need to move the vehicle from the prescribed parking space. The recharging threshold time (Ta) therefore is set based on the time required to restart recharging of the same vehicle from the charging end time.

The vehicle backlog threshold time (Tb) is described. Assume that a first vehicle 300 was being charged by the charging device 100 and charging ended because the elapsed time from the start of charging reached the maximum charging time ($T_{max}$) before the battery of the vehicle 300 reached full charge. Also assume that another vehicle other than the first vehicle 300 was waiting to be charged by the charging device 100 at the end of charging. The charging operator of the first vehicle 300 moves the first vehicle 300 from the prescribed parking space to switch charging to the other vehicle 300 waiting to be charged. The second vehicle 300 waiting to be charged is parked in the prescribed parking space, the operator of the second vehicle 300 operates the operating panel, presses the charging start button, and starts charging.

When a backlog for charging has arisen in the charging device 100 as above, the charging connector 102 must be removed from the first vehicle, the vehicles parked in the prescribed parking space must be switched, and the charging connector 102 must be connected to the second vehicle. The usage latency from the first charging end time to the second charging start time therefore is longer than the usage latency during recharging. The vehicle backlog threshold time ($T_b$) therefore is set based on the time required to start charging with a different vehicle from the charging end time, and is set to a time longer than the recharging threshold time ($T_a$). The vehicle backlog threshold time ($T_b$) should be set in accordance with the places for movement of the vehicle including the prescribed parking space.

When a vehicle backlog has not arisen but recharging of the same vehicle is not performed, the usage latency from the charging end time to the next charging start time becomes longer than the recharging threshold time (Ta) and the vehicle backlog threshold time (Tb).

The controller 10 compares the usage latency calculated by the usage latency calculation unit 11 with the recharging threshold time ($T_a$) and the vehicle backlog threshold time ($T_b$). When the usage latency is greater than or equal to the vehicle backlog threshold time ($T_b$), the controller 10 determines that recharging of the same vehicle is not performed and there is no backlog of vehicles waiting to be charged, and sets a flag indicating the usage status of the charging device to "0." When the usage latency is longer than the recharging threshold time ($T_a$) and is shorter than the vehicle backlog threshold time ($T_b$), the controller 10 determines that a backlog of vehicles waiting to be charged has arisen, and sets the flag indicating the usage status of the charging device to "1." When the usage latency is less than or equal to the recharging threshold time ($T_a$), the controller determines that recharging of the same vehicle was performed, and sets the flag indicating the usage status of the charging device to "2."

A factor (ratio) for adjusting the charging time in accordance with the status of the flag is set in the charging time setting unit 12. The charging time setting unit 12 also sets the charging time by multiplying the maximum charging time ($T_{max}$) by the factor. When the flag is "0," there is no impediment even to charging in the maximum charging time ($T_{max}$.) because there is no backlog of vehicles waiting to be charged. The factor ($R_0$) when the flag is "0" therefore is set to "1."

When the flag is "1," the time waiting to be charged becomes longer when charging is performed in the maximum charging time ($T_{max}$) because there is a backlog of vehicles waiting to be charged. The factor ($R_1$) when the flag is "1" therefore is set to a value smaller than "1," for example "0.8." The charging time is thereby shortened by multiplying the maximum charging time ($T_{max}$) by the factor ($R_1$), the vehicle waiting to be charged therefore can start charging at an earlier time, and the time waiting to be charged is shortened.

When the flag is "2," it is the case that recharging is performed. Therefore, when the charging time is set to the same time as the charging time for when there is a backlog of vehicles waiting to be charged, the charging time becomes shortened despite the fact that there is no vehicle backlog, and the number of times of recharging might increase. The factor ($R_2$) when the flag is "2" therefore is set to a value greater than the factor ($R_1$), for example "0.9." The charging time during recharging can thereby be prevented from being unnecessarily shortened because the time is set when recharging to be longer than the charging time during vehicle backlog.

The charging time setting unit 12 also sets the charging time in accordance with the temperature detected by the temperature sensor 4. For example, in night time periods in cold regions, and the like, the battery charging efficiency may be lowered compared to daytime when the temperature of the environment in which the charging device is placed is low. Because the temperature sensor 4 detects the external temperature of the charging device 100, the charging time setting unit 12 sets a temperature factor ($\alpha$) for adjusting the charging time in accordance with the temperature detected by the temperature sensor 4, and sets the charging time by multiplying the maximum charging time ($T_{max}$) by the temperature factor ($\alpha$). The temperature factor ($\alpha$) is a value greater than 1.

A threshold temperature for determining whether to change or not to change the charging time is preset in the controller 10. The threshold temperature is a threshold that is preset based on the charging efficiency, or the like, relative to the ambient temperature of the environment in which the charging device 100 is placed. The controller 10 compares the temperature detected by the temperature sensor 4 with the threshold temperature. When the detected temperature is higher than the threshold temperature, the controller 10 determines that the ambient temperature of the charging device 100 is high and there is no need to lengthen the charging time, and performs a control so that the maximum charging time ($T_{max}$) is not multiplied by the temperature factor ($\alpha$) in the charging time setting unit 12. Meanwhile, when the detected temperature is lower than the threshold temperature, the controller 10 determines that the ambient temperature of the charging device 100 is low and the charging time must be lengthened, and controls so that the maximum charging time ($T_{max}$) is multiplied by the temperature factor ($\alpha$) in the charging time setting unit 12.

The charging time setting unit 12 can thereby set a charging time longer than the maximum charging time ($T_{max}$) based on the temperature factor ($\alpha$) when there is no backlog of vehicles to be charged and the temperature detected by the temperature sensor is lower than the threshold temperature, such as in a night time period in a cold region. As a result, the present example can provide a charging system that is more highly convenient for the user.

Figure 3:
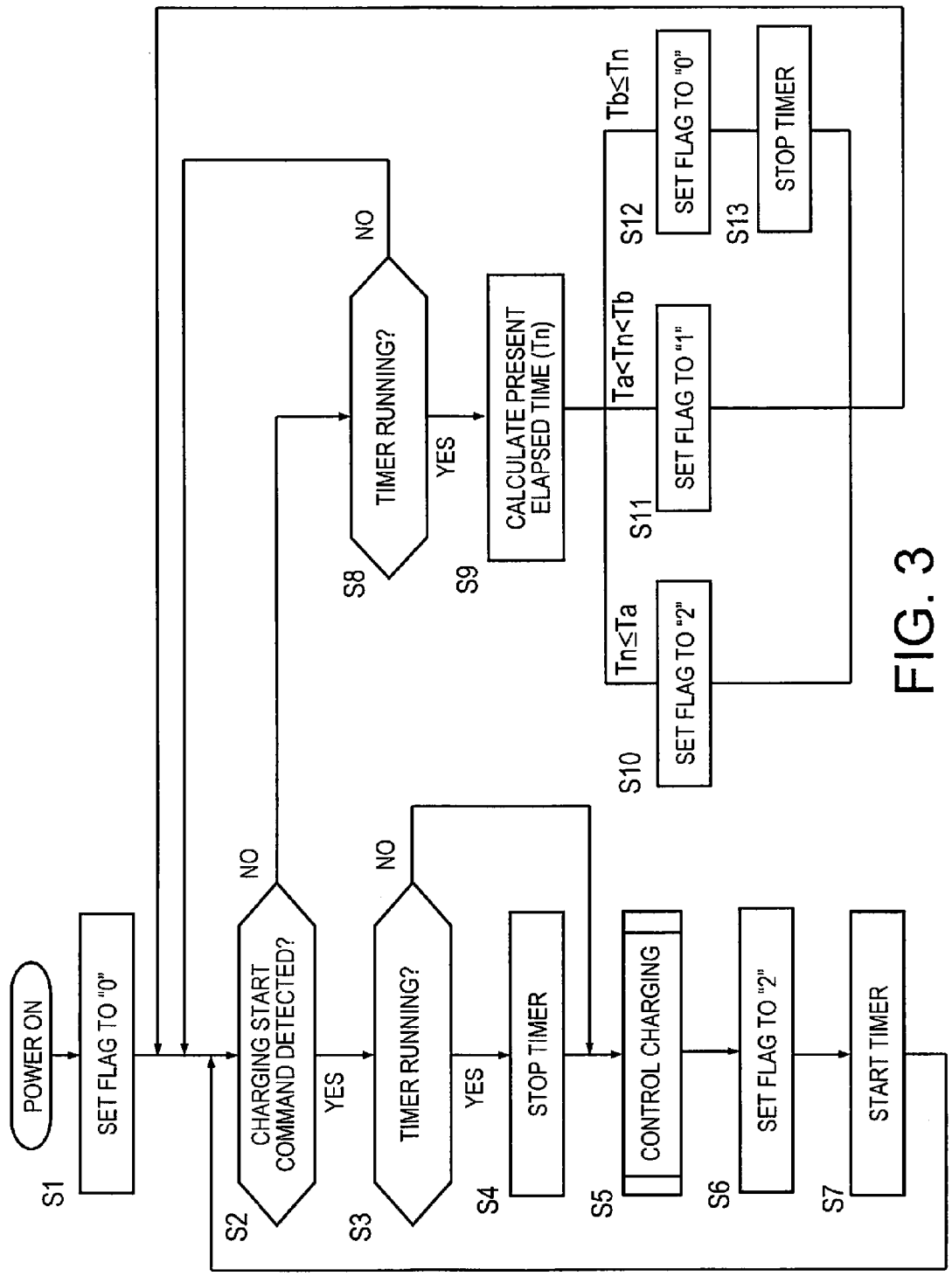
FIG. 3 is a flow chart illustrating the control procedure executed by the charging device in FIG. 2.
Figure 4:
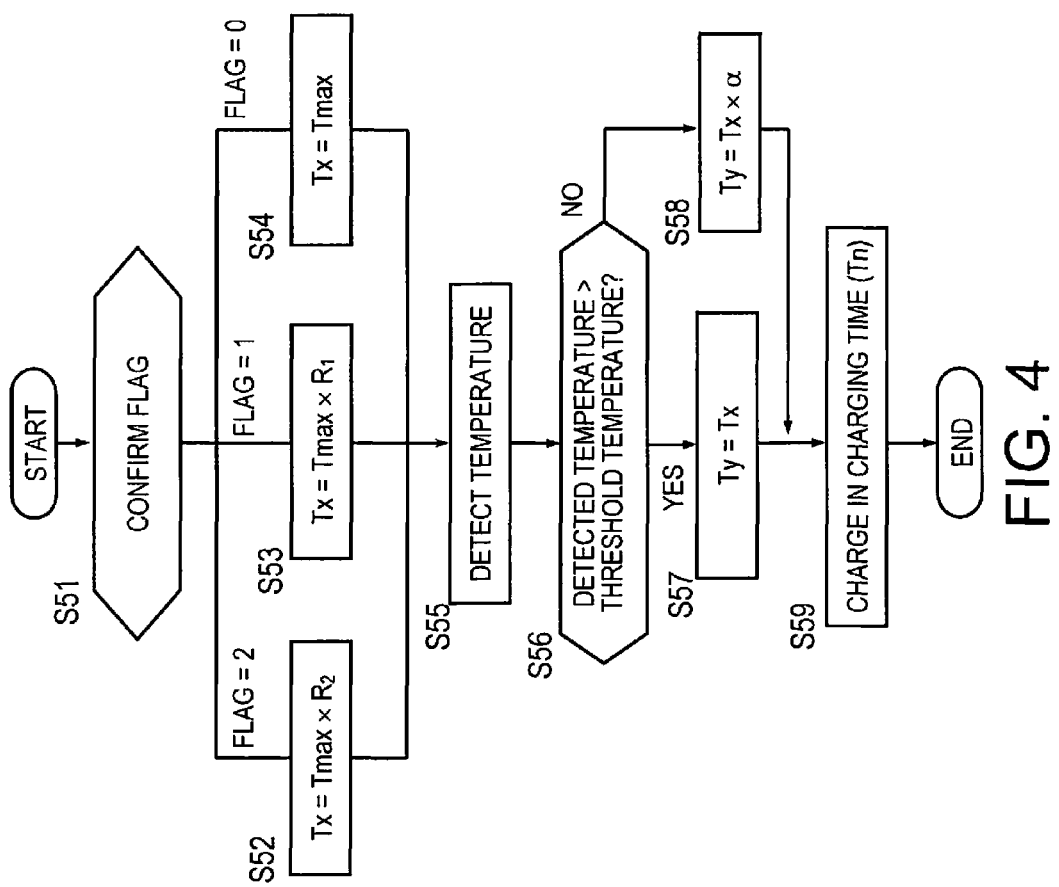
FIG. 4 is a flow chart illustrating the control procedure of the charging control in FIG. 3.

The control procedure of the charging device 100 of the present example is described using FIGS. 3 and 4. FIG. 3 is a flowchart illustrating the control procedure of the charging device of the present example. FIG. 4 is a flowchart of the control procedure of charging control in the control processing illustrated in FIG. 3.

When a main switch of the charging device 100 of the present example is turned on, in step S1, the controller 10 sets the flag to "0" as an initial status. In step S2, the controller 10 detects whether a charging start command was or was not issued by the charging operator based on an operating signal of the operating panel 2. The flow transitions to step S3 when an operating signal indicating the charging start command is detected, and the flow transitions to step S8 when an operating signal indicating the charging start command is not detected.

In step S3, the controller 10 confirms the status of the timer 3 and confirms whether the timer 3 is or is not running. The flow transitions to step S5 when the timer 3 is not running. When the timer 3 is running, in step S4, the controller 10 stops the timer 5.

In step S5, the controller 10 controls the charger 1 and starts charging of the battery 1 in the charging time set by the charging time setting unit 12. The flow transitions to step S6 when the charging control ends. The charging control in step S5 is described later.

In step S6, the controller 10 sets the flag to "2." In step S7, the controller 10 drives the timer 3 to start counting time, and the flow returns to step S2. The charging device 100 thereby assumes the charging state when the charging start command is detected in step S2, and the running timer 3 is stopped in step S4. When the charging control ends, the timer is driven in step S7, whereby the timer 3 is driven to count the usage latency when charging is not being performed using the charging device 100.

The flow returns to step S2, and when the charging start command has not been detected, in step S8, the controller 10 confirms the status of the timer 3 and confirms whether the timer 3 is or is not running. The flow transitions to step S9 when the timer 3 is running 3. Meanwhile, the flow returns to step S2 when the timer 3 is not running.

In step S9, the controller 10 calculates the elapsed time (Tn) from the start of charging to the present from the time counted by the timer 3. The controller 10 also sets the elapsed time (Tn) as the usage latency using the usage latency calculation unit 11, and compares the usage latency (Tn) with the recharging threshold time (Ta) and the vehicle backlog threshold time (Tb).

When the usage latency (Tn) is less than or equal to the recharging threshold time (Ta), in step S10, the controller 10 sets the flag to "2" and the flow returns to step S2. When the usage latency (Tn) is longer than the recharging threshold time (Ta) and is shorter than the vehicle backlog threshold time (Tb), in step S11, the controller 10 sets the flag to "1" and the flow returns to step S2. That is, when the charging start command is detected in step S2 after step S10 or step S11 with the flag status as "2" or "1," charging control is performed in step S5 with the flag status as "2" or "1." In the charging control, the charging time is set variously in accordance with the flag status. The usage latency thereby becomes a time between the charging end time and the charging start time thereafter, the controller 10 sets the charging time in accordance with the usage latency, and the battery is charged.

Meanwhile, when the usage latency (Tn) is greater than or equal to the vehicle backlog threshold time (Tb), the controller 10 sets the flag to "0" in step S12, the controller 10 stops the timer 3 in step S13, and the flow returns to step S2. When the elapsed time (Tn) of the timer 3 is greater than or equal to the vehicle backlog threshold time (Tb), as long as the charging start command is not detected and the charging control has not ended, the flag status may be left as "0" and there is longer a need to count the time by the timer 3, even if the flow illustrated in FIG. 3 is iterated. The controller 10 therefore stops the timer 3 in step S13. When the charging start command is detected in step S2 after step S13 with the flag status as "0," charging control is performed in step S5 with the flag status as "0." In the charging control, the charging time is set in accordance with the flag status "0."

In the control illustrated in FIG. 3, when the main switch is turned off, the flow escapes from the control flow in FIG. 3, and the controller 10 ends the control processing of the present example.

The control procedure of the charging control in step S5 in FIG. 3 is next described using FIG. 4. In step S51, the controller 10 confirms the flag status. When the flag status is "2," in step S52, the charging time setting unit 12 multiplies the maximum charging time ($T_{max}$) by the factor ($R_2$) to calculate the charging time (Tx). When the flat status is "1," in step S53, the charging time setting unit 12 multiplies the maximum charging time ($T_{max}$) by the factor ($R_1$) to calculate the charging time (Tx). When the flat status is "0," in step S54, the charging time setting unit 12 multiplies the maximum charging time ($T_{max}$) by the factor ($R_0$) to calculate the charging time (Tx).

In step S55, the controller 10 controls the temperature sensor 4 to detect the ambient temperature of the charging device 100. In step S56, the controller 10 compares the detected temperature with the threshold temperature. When the detected temperature is higher than the threshold temperature, the charging time setting unit 12 sets the charging time (Tx) calculated in steps S52 to 54 as the charging time (Ty). Meanwhile, when the detected temperature is less than or equal to the threshold temperature, in step S58, the charging time setting unit 12 multiplies the charging time (Tx) calculated in steps S52 to 54 by the temperature factor ($\alpha$) to calculate the charging time (Ty).

In step S59, the controller 10 controls the charger 1 to charge the battery of the vehicle 300 in the charging time (Ty) calculated in step S58 or step S59. When the elapsed time of charging after the start of charging reaches the charging time (Ty) before the charging capacity of the battery reaches full charge, or when the charging capacity of the battery reaches full charge before the elapsed time of charging after the start of charging reaches the charging time (Ty), the controller 10 ends charging control 10 and the flow transitions to step S6 in FIG. 3.

As mentioned above, the present invention comprises: a usage latency calculation unit 11 for calculating a usage latency of the charger 1, being a time between the end of charging of a vehicle 300 that was connected to the charger 1 and the start of charging of a vehicle 300 that is connected to the charger and is charged after the former vehicle 300; and a charging time setting unit 12 for setting a charging time in accordance with the usage latency. In the present example, the charging time is thereby adjusted upon having discriminated whether a vehicle waiting to be charged is present or absent in accordance with the length of the usage latency, and the time waiting to be charged therefore can be shortened.

In the present example, the charging time is set to the maximum charging time (T.) when the usage latency is longer than the vehicle backlog threshold time (Tb), and the charging time is set to a charging time ($T_{max} \times R_1$) shorter than the maximum charging time ($T_{max}$) when the usage latency is shorter than the vehicle backlog threshold time (Tb). The time spent by backlogged vehicles waiting to be charged can thereby be shortened by shortening the charging time when the usage latency is short and it is determined that a backlog of vehicles waiting to be charged has arisen.

In the present example, the charging time is set to a charging time ($T_{max} \times R_2$) longer than the charging time ($T_{max} \times R_1$) when the usage latency is less than or equal to the recharging threshold time (Ta). The charging time is thereby set longer than the charging time for when there is a backlog of vehicles waiting to be charged, when the usage latency is short and it is determined that recharging of the same vehicle is being performed, the charging time can thereby be prevented from being unnecessarily shortened during recharging, and the number of charging cycles until the battery is fully charged can be reduced as a result.

In the present example, the charging time is set in accordance with a temperature detected by a temperature sensor 4. The external temperature of the charging device 100 is thereby accounted for, the charging time can be controlled, and a charging device that is highly convenient for the user can be provided.

In the present example, the charging time is set to a charging time ($T_{max} \times R_2$) shorter than the maximum charging time ($T_{max}$) when the usage latency is less than or equal to the recharging threshold time (Ta), but the charging time may be set to the maximum charging time ($T_{max}$). That is, in recharging of the same vehicle, shortening of the charging time of the first cycle is disallowed during the second cycle of charging control, by setting the charging time during the second cycle of charging control so as not to be shortened relative to the charging time set during the first cycle of charging control. Because a charging time shorter than the previous charging time is thereby not set during recharging, the charging time can be prevented from being unnecessarily shortened, and the number of charging cycles until the battery is fully charged can be reduced as a result.

In the present example, it is determined that recharging of the same vehicle is being performed when the usage latency is less than or equal to the recharging threshold time (Ta), and the charging time may be set maintaining the charging time of the first cycle of charging control during the second cycle of charging control. In the present example, because the charging time is maintained when the usage latency is less than or equal to the recharging threshold time (Ta), a charging time shorter than the previous charging time is not set during recharging, the charging time therefore can be prevented from being unnecessarily shortened, and the number of charging cycles until the battery is fully charged can be reduced as a result.

In the present example, the temperature factor ($\alpha$) was set to a value greater than 1, but the temperature factor ($\alpha$) may be set to a value smaller than 1. The turnover of charging control can thereby be increased when the ambient temperature of the charging device 100 is low. Also in the present example, the charging time may be set by multiplying the maximum charging time ($T_{max}$) by a temperature factor ($\alpha$) having a value greater than 1 when the usage latency (Tn) is longer than the recharging threshold time (Ta) and shorter than the vehicle backlog threshold time (Tb) and the temperature detected by the temperature sensor 4 is less than or equal to the threshold temperature. Because the charging time can thereby be shortened when the ambient temperature of the charging device 100 is low and there is a backlog of vehicles waiting to be charged, the turnover of charging control can be increased while shortening the time waiting to be charged.

The abovementioned charging time setting unit 12 is equivalent to the "charging time setting means" according to the present invention, and the usage latency calculation unit 11 is equivalent to the "usage latency calculation means."

The invention claimed is:

1. A charging device comprising:
   a charger configured to charge a battery of a vehicle;
   a charging time setting unit configured to set a charging time for charging the battery of a vehicle; and
   a usage latency calculation unit configured to calculate a usage latency of the charger, the usage latency being a time between an end time of charging a battery of a first vehicle connected to the charger and a start time of charging a battery of a second vehicle connected to the charger and to be charged after the battery of the first vehicle is charged;
   wherein the charging time setting unit is configured to compare the usage latency with a first threshold time and a second threshold time, which is shorter than the first threshold time, and configured to set the charging time in accordance with whether or not the usage latency is between the first threshold time and the second threshold time.

2. The charging device according to claim 1, wherein
   the charging time setting unit is further configured to set the charging time to a first charging time when the usage latency is longer than the first threshold time; and
   the charging time setting unit is further configured to set the charging time to a second charging time that is shorter than the first charging time when the usage latency is shorter than the first threshold time.

3. The charging device according to claim 1, wherein
   the charging time setting unit is further configured to disallow shortening of the charging time when the usage latency is less than or equal to the second threshold time indicating that the battery of the first vehicle was recharged immediately following the end time.

4. The charging device according to claim 1, wherein
   the charging time setting unit is further configured to maintain the charging time when the usage latency is less than or equal to the second threshold time indicating that the battery of the first vehicle was recharged immediately following the end time.

5. The charging device according to claim 2, wherein
   the charging time setting unit is further configured to set the charging time to a time longer than the second charging time when the usage latency is less than or equal to the second threshold time indicating that the battery of the first vehicle was recharged immediately following the end time.

6. The charging device according to claim 1, further comprising:
   a temperature sensor configured to detect an exterior temperature of the charging device;
   wherein the charging time setting unit is further configured to set the charging time in accordance with the exterior temperature detected by the temperature sensor.

7. The charging device according to claim 2, wherein
   the charging time setting unit is further configured to disallow shortening of the charging time when the usage latency is less than or equal to the second threshold time indicating that the battery of the first vehicle was recharged immediately following the end time.

8. The charging device according to claim 2, wherein
   the charging time setting unit is further configured to maintain the charging time when the usage latency is less than or equal to the second threshold time indicating that the battery of the first vehicle was recharged immediately following the end time.

9. The charging device according to claim 2, further comprising:
a temperature sensor configured to detect an exterior temperature of the charging device;
wherein the charging time setting unit is further configured to set the charging time in accordance with the exterior temperature detected by the temperature sensor.

10. The charging device according to claim 3, further comprising
a temperature sensor configured to detect an exterior temperature of the charging device;
wherein the charging time setting unit is further configured to set the charging time in accordance with the exterior temperature detected by the temperature sensor.

11. The charging device according to claim 4, further comprising:
a temperature sensor configured to detect an exterior temperature of the charging device;
wherein the charging time setting unit is further configured to set the charging time in accordance with the exterior temperature detected by the temperature sensor.

12. The charging device according to claim 5, further comprising:
a temperature sensor configured to detect an exterior temperature of the charging device;
wherein the charging time setting unit is further configured to set the charging time in accordance with the exterior temperature detected by the temperature sensor.

13. The charging device according to claim 7, further comprising:
a temperature sensor configured to detect an exterior temperature of the charging device;
wherein the charging time setting unit is further configured to set the charging time in accordance with the exterior temperature detected by the temperature sensor.

14. The charging device according to claim 8, further comprising:
a temperature sensor configured to detect an exterior temperature of the charging device;
wherein the charging time setting unit is further configured to set the charging time in accordance with the exterior temperature detected by the temperature sensor.

* * * * *